(12) United States Patent
Wang et al.

(10) Patent No.: US 11,327,736 B2
(45) Date of Patent: May 10, 2022

(54) UPDATE METHOD, SYSTEM, END NODE AND ELECTRONIC DEVICE

(71) Applicant: Alibaba Group Holding Limited, Grand Cayman (KY)

(72) Inventors: Lu Wang, Shanghai (CN); Ting Gui, Hangzhou (CN); Liangliang Zhu, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 0 days.

(21) Appl. No.: 16/726,680

(22) Filed: Dec. 24, 2019

(65) Prior Publication Data

US 2020/0133655 A1 Apr. 30, 2020

Related U.S. Application Data

(63) Continuation of application No. PCT/CN2018/091949, filed on Jun. 20, 2018.

(30) Foreign Application Priority Data

Jun. 27, 2017 (CN) .......................... 201710499122.3

(51) Int. Cl.
*G06F 8/65* (2018.01)
*G06F 9/445* (2018.01)
*H04W 84/18* (2009.01)

(52) U.S. Cl.
CPC ............ *G06F 8/65* (2013.01); *G06F 9/44505* (2013.01); *H04W 84/18* (2013.01)

(58) Field of Classification Search
CPC .................................... G06F 9/44; G06F 8/65
See application file for complete search history.

(56) References Cited

U.S. PATENT DOCUMENTS 7,574,706 B2 8/2009 Meulemans et al.
8,316,364 B2 11/2012 Stein
(Continued)

FOREIGN PATENT DOCUMENTS

CN 103324507 A 9/2013
CN 103731506 A 4/2014
(Continued)

OTHER PUBLICATIONS

Translation of Chinese Office Action and Search Report dated Dec. 30, 2020, from corresponding CN Patent Application No. 201710499122.3, 19 pages.
(Continued)

*Primary Examiner* — Jae U Jeon
(74) *Attorney, Agent, or Firm* — Lee & Hayes, P.C.

(57) ABSTRACT

An updating method including: acquiring, by an active update node, update information from a server; and acquiring or receiving, by a passive update node, the update information from the active update node through a local network. By using the update method and system, end node and electronic device provided in the present disclosure, an active update node of a plurality of end nodes in the same local network acquires update information from a server, and a passive update node acquires the update information from the active update node, thereby reducing the number of end nodes acquiring the update information from the server, and reducing the burden of the cloud.

18 Claims, 8 Drawing Sheets

(56) References Cited

U.S. PATENT DOCUMENTS

| | | | |
|---|---|---|---|
| 8,671,402 B2 | 3/2014 | McCurdy et al. | |
| 9,003,432 B1* | 4/2015 | Pellowski | G06F 11/3485 |
| | | | 719/321 |
| 9,563,545 B2 | 2/2017 | Bennah et al. | |
| 9,804,901 B2 | 10/2017 | Gambardella et al. | |
| 10,395,054 B2 | 8/2019 | Resch | |
| 10,904,111 B2* | 1/2021 | Joffe | H04L 67/1061 |
| 2002/0172157 A1* | 11/2002 | Rhodes | H04L 45/123 |
| | | | 370/238 |
| 2005/0013297 A1* | 1/2005 | Eriksson | H04L 12/4616 |
| | | | 370/392 |
| 2005/0240780 A1* | 10/2005 | MacIsaac | H04L 63/1416 |
| | | | 713/188 |
| 2006/0240821 A1* | 10/2006 | Chien | H04M 1/72406 |
| | | | 455/433 |
| 2008/0270820 A1* | 10/2008 | Kondo | H04L 45/22 |
| | | | 714/2 |
| 2009/0124234 A1 | 5/2009 | Fisher et al. | |
| 2009/0287917 A1 | 11/2009 | Carpenter et al. | |
| 2010/0042715 A1* | 2/2010 | Tham | H04L 67/1034 |
| | | | 709/224 |
| 2011/0113418 A1 | 5/2011 | McCurdy et al. | |
| 2011/0138379 A1 | 6/2011 | Porter et al. | |
| 2014/0058876 A1* | 2/2014 | Lewis | G06Q 30/08 |
| | | | 705/26.3 |
| 2014/0115675 A1* | 4/2014 | Jung | H04L 63/0853 |
| | | | 726/6 |
| 2015/0112542 A1* | 4/2015 | Fuglewicz | G07C 5/0816 |
| | | | 701/32.2 |
| 2015/0163094 A1* | 6/2015 | Maggiari | H04L 41/0816 |
| | | | 370/254 |
| 2016/0065682 A1* | 3/2016 | Li | H04L 67/26 |
| | | | 709/204 |
| 2016/0189535 A1* | 6/2016 | Huang | G05B 15/02 |
| | | | 340/12.5 |
| 2018/0005062 A1* | 1/2018 | Aguera-Arcas | G06K 9/00993 |
| 2018/0307737 A1* | 10/2018 | Xie | G06F 16/273 |

FOREIGN PATENT DOCUMENTS

| | | |
|---|---|---|
| CN | 105049502 A | 11/2015 |
| CN | 105354066 A | 2/2016 |

OTHER PUBLICATIONS

Translation of Chinese International Search Report dated Sep. 11, 2018, from corresponding CN PCT Application No. PCT/CN2018/091949, 2 pages.

Translation of Chinese Written Opinion dated Sep. 11, 2018, from corresponding CN PCT Application No. PCT/CN2018/091949, 3 pages.

Translation of 2nd Chinese Office Action dated Jul. 21, 2021, from corresponding CN Patent Application No. 201710499122.3, 6 pages.

* cited by examiner

UPDATE METHOD, SYSTEM, END NODE AND ELECTRONIC DEVICE

CROSS REFERENCE TO RELATED PATENT APPLICATIONS

This application claims priority to and is a continuation of PCT Patent Application No. PCT/CN2018/091949, filed on 20 Jun. 2018 and entitled "UPDATE METHOD, SYSTEM, END NODE AND ELECTRONIC DEVICE," which claims priority to Chinese Patent Application No. 201710499122.3, filed on 27 Jun. 2017 and entitled "UPDATE METHOD, SYSTEM, END NODE AND ELECTRONIC DEVICE," which are incorporated herein by reference in their entirety.

TECHNICAL FIELD

The present disclosure relates to the field of computer technologies, and, more particularly, to update methods, systems, end nodes and electronic devices.

BACKGROUND

In the era of the internet, tens of billions of items with chips are connected to the Internet, forming the architecture of the Internet of Things. Items in the Internet of Things involve everything from daily life and industry, ranging from large transportation vehicles to small parts. The chip on the item or the item itself (for example, the item itself is a smart device with a chip) is connected to the Internet as an end device (i.e., an end node). Such items may be distributed in homes, factories, streets, and anywhere else. During use, configurations and firmware of the end nodes will inevitably be upgraded.

In the conventional techniques, each end node independently establishes and maintains a cloud channel with a server of a cloud and acquires update information from the server through the cloud channel for configuration and firmware update.

At least the following problems exist in the conventional techniques: if tens of billions of end nodes all acquire update information from the server for configuration and firmware update, the burden of the cloud is increased. The computing resources, such as bandwidth or processors, may not be sufficient to support such large-scale update, thereby ending in failure of the updates of the end nodes and network congestion.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

The present disclosure provides an update method and system, an end node and an electronic device, to reduce the burden of a cloud.

The present disclosure adopts the following technical solutions.

For example, the present disclosure provides an update method, wherein a plurality of end nodes is connected through a local network, and the plurality of end nodes includes at least one active update node and at least one passive update node, the update method including: acquiring, by the active update node, update information from a server; and acquiring, by the passive update node, the update information from the active update node through a local network.

For example, the present disclosure further provides an update method, including: acquiring update information from a server; and providing the update information through a current local network to a passive update node in the local network.

For example, the present disclosure further provides an update method, including: acquiring, through a current local network, update information from an active update node in the local network.

For example, the present disclosure further provides an update system, including: a local network, a plurality of end nodes and a server, wherein the plurality of end nodes is connected through the local network, the plurality of end nodes includes at least one active update node and at least one passive update node, and the active update node is connected to the server; the active update node acquires update information from the server; and the passive update node acquires the update information from the active update node through the local network.

For example, the present disclosure further provides an end node, including: a first acquiring module configured to acquire update information from a server; and a providing module configured to provide the update information through a current local network to a passive update node in the local network.

For example, the present disclosure further provides an end node, including: a second acquiring module configured to acquire, through a current local network, update information from an active update node in the local network.

For example, the present disclosure further provides an electronic device, including: a memory configured to store a program or computer-readable instruction; and a processor coupled to the memory and configured to execute the program to: acquire update information from a server; and provide the update information through a current local network to a passive update node in the local network.

For example, the present disclosure further provides an electronic device, including: a memory configured to store a program or computer-readable instructions; and a processor coupled to the memory and configured to execute the program to: acquire, through a current local network, update information from an active update node in the local network.

By using the update method and system, the end node and the electronic device provided in the present disclosure, only an active update node of a plurality of end nodes in the same local network acquires update information from a server, and a passive update node acquires the update information from the active update node, thereby reducing the number of end nodes acquiring the update information from the server, and reducing the burden of the cloud.

The above description is only an overview of the technical solutions of the present disclosure. In order to more clearly understand the technical means of the present disclosure, the present disclosure may be implemented in accordance with the contents of the specification. To make the above-mentioned and other objectives, features and advantages of the present disclosure more comprehensible, some example embodiments of the present disclosure are set forth below.

BRIEF DESCRIPTION OF THE DRAWINGS

Through the detailed description of example embodiments below, various technical advantages and benefits of the present disclosure will become apparent to those skilled in the art. The drawings are only provided for the purpose of illustrating the example embodiments and are not to be construed as limiting. Throughout the drawings, the same reference numerals are used to refer to the same parts. In the drawing.

DETAILED DESCRIPTION

Figure 1:
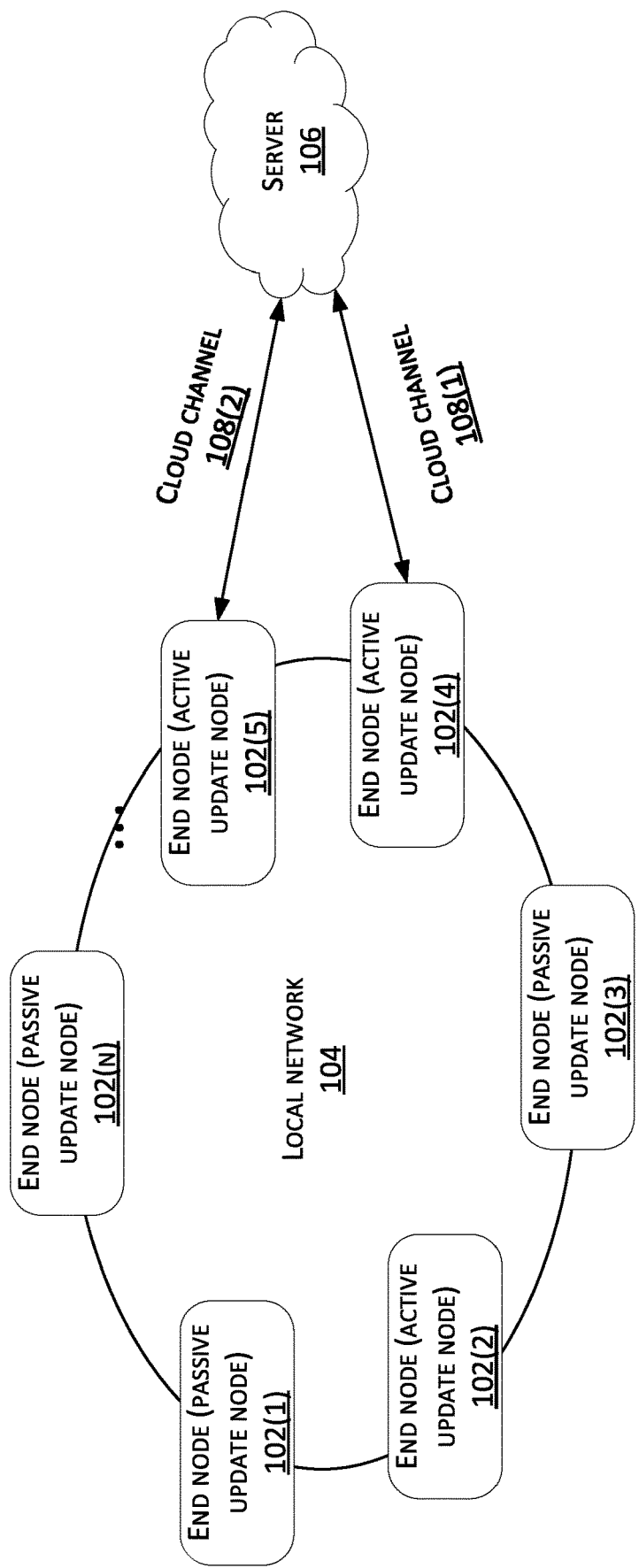
FIG. 1 is a schematic structural view of an update system according to the present disclosure.

Example embodiments of the present disclosure will be described in further detail below with reference to the accompanying drawings. Although the example embodiments of the present disclosure have been shown in the drawings, it should be understood that the present disclosure may be implemented in various forms and is not intended to be limited by the example embodiments set forth herein. Rather, these example embodiments are provided for more thorough understanding of the present disclosure and may convey the scope of the present disclosure to those skilled in the art.

Description of Relevant Terms

End node: It is an end device accessing the Internet. The end device may be a chip disposed on an item or the item itself, for example, a smart device with a chip, such as a mobile phone, a computer, a PAD, a traffic camera, or a vending machine.

Server: It is a server responsible for updating at the cloud, and mainly has the functions of storing and managing update information. The update information mainly includes firmware update information and configuration update information.

Local network: It is formed by a plurality of end nodes. The plurality of end nodes is connected through a local network such as a distributed self-configuring network. For example, a wireless mesh network constitutes the local network.

Cloud channel: It is mainly configured to transmit update information between the local network and the server. The end node establishes and maintains a cloud channel with the server and performs an update. The cloud channel may be a cloud Over-the-Air Technology (OTA) channel.

Active update node: It is an end node that has established a cloud channel with the server and may directly acquire or receive the update information from the server at the cloud for updating.

Passive update node: It is an end node that has not established a cloud channel with the server and may acquire the update information from the active update node for updating.

The technical principle of the present disclosure is explained below:

The example embodiments of the present disclosure take into consideration that the burden of the cloud will be heavy if each of the plurality of end nodes needs to establish and maintain a cloud channel with the server and acquire update information from the server for updating, and that some end nodes such as a mobile end node and a low-power end node are not suitable for establishing and maintaining a cloud channel for a long time for updating. Therefore, to reduce the burden of the cloud and to enable the end nodes not suitable for establishing and maintaining a cloud channel for a long time for updating to perform an update without establishing a cloud channel, in the example embodiments of the present disclosure, as shown in FIG. 1, a plurality of end nodes is connected through a local network, and an active update node in the plurality of end nodes establishes a cloud channel with a server and acquires update information from the server for updating, and a passive update node in the plurality of end nodes acquires the update information from the active update node through the local network for updating.

The above example embodiments are a description of the example technical solutions of the present disclosure. To enable those skilled in the art to clearly and accurately understand the technical solutions of the present disclosure, the technical solutions of the present disclosure will be described in detail below with reference to the accompanying drawings and specific example embodiments.

Example Embodiment 1

Figure 2:
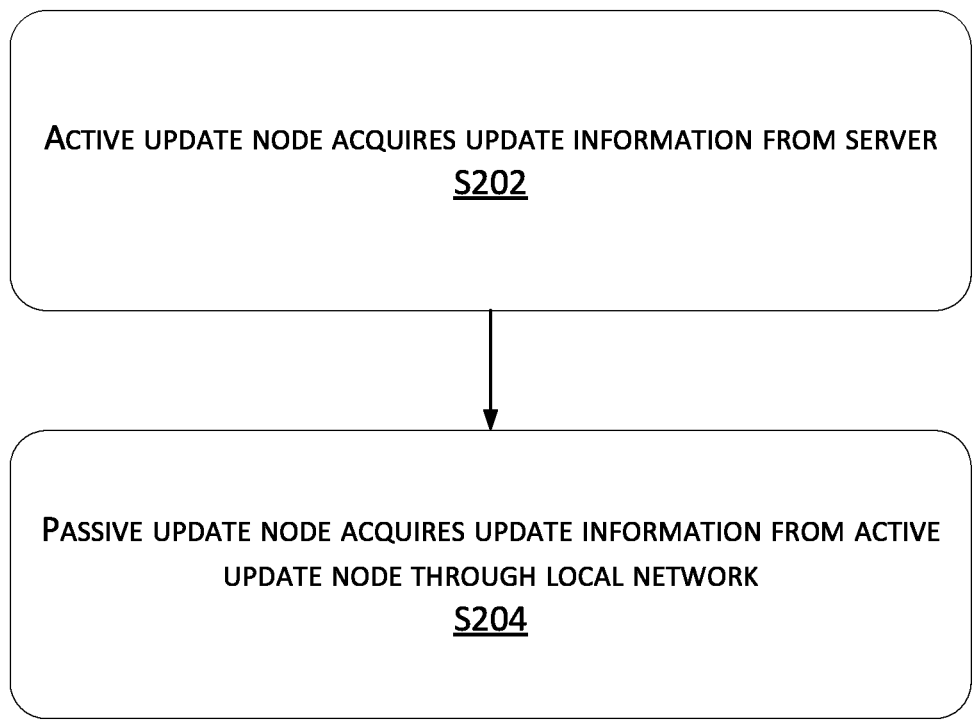
FIG. 2 is a schematic flowchart of an example embodiment of an update method according to the present disclosure.

FIG. 2 is a schematic flowchart of an example embodiment of an update method according to the present disclosure. The update method in the example embodiments of the present disclosure may be applied to an update system shown in FIG. 1, that is, the update method in the example embodiments of the present disclosure is executed by the update system shown in FIG. 1. In the update system, a plurality of end nodes 102(1), 102(2), 102(3), 102(4), 102(5), . . . 102(n), is connected through a local network 104, wherein n may be any integer. The plurality of end nodes includes at least one active update node such as 102(4) and 102(5) and at least one passive update node such as 102(1), 102(2), 102(3), and 102(n). The active update nodes 102(4) and 102(5) acquire update information form a server 106 via one or more cloud channels 108(1) and 108(2) respectively. The active update nodes 102(4) and 102(5) then send the update information to the passive update nodes 102(1), 102(2), 102(3), and 102(n) through the local network 104 using various methods.

As shown in FIG. 2, the update method in the example embodiments of the present disclosure may, for example, include:

S202. The active update node acquires update information from a server.

For example, the active update node and the server may be connected through a cloud channel. Each of the plurality of end nodes may independently determine, according to a resource thereof and/or a location thereof in the local network, whether it is suitable for establishing and maintaining a cloud channel for a long time, so as to determine whether to become the active update node. After determining to become the active update node, the end node actively establishes a cloud channel with the server. The cloud channel may be an OTA channel. In the local network, the number of active update nodes may be one or more. The end node not suitable for establishing and maintaining a cloud channel for a long time, for example, a mobile end node or a low-power end node, autonomously determines not to become the active update node, but to become the passive update node.

The active update node may actively acquire the update information from the server or may receive the update information actively pushed by the server. After acquiring the update information, the active update node performs an update operation according to the update information. The update information includes but is not limited to firmware update information and configuration update information. The firmware update information includes a firmware update file. The firmware update file is generally of a large size, and therefore is usually stored in the server in the form of differential packages, and the server also needs to perform differential management of firmware versions and firmware differences. The firmware differences are differences between different firmware versions. The configuration update information includes a configuration update file. The configuration update file is generally of a small size, and therefore is usually stored in the server in the form of a full package.

S204. The passive update node acquires the update information from the active update node through the local network.

For example, the plurality of end nodes may constitute the local network by using a distributed self-configuring network, for example, a wireless mesh network. When determining not to become the active update node, the end node automatically becomes the passive update node. The passive update node has not established a cloud channel with the server, and therefore acquires the update information from the active update node through the local network and performs an update according to the update information. The passive update node may actively acquire the update information from the active update node or may receive the update information actively sent by the active update node. As the passive update node, the end node not suitable for establishing and maintaining a cloud channel for a long time, for example, a mobile end node or a low-power end node, may implement an update without establishing a cloud channel with the server.

By using the update method according to the example embodiment of the present disclosure, only an active update node of a plurality of end nodes in the same local network acquires update information from a server, and a passive update node acquires the update information from the active update node, thereby reducing the number of end nodes acquiring the update information from the server, and reducing the burden of the cloud.

Example Embodiment 2

Figure 3:
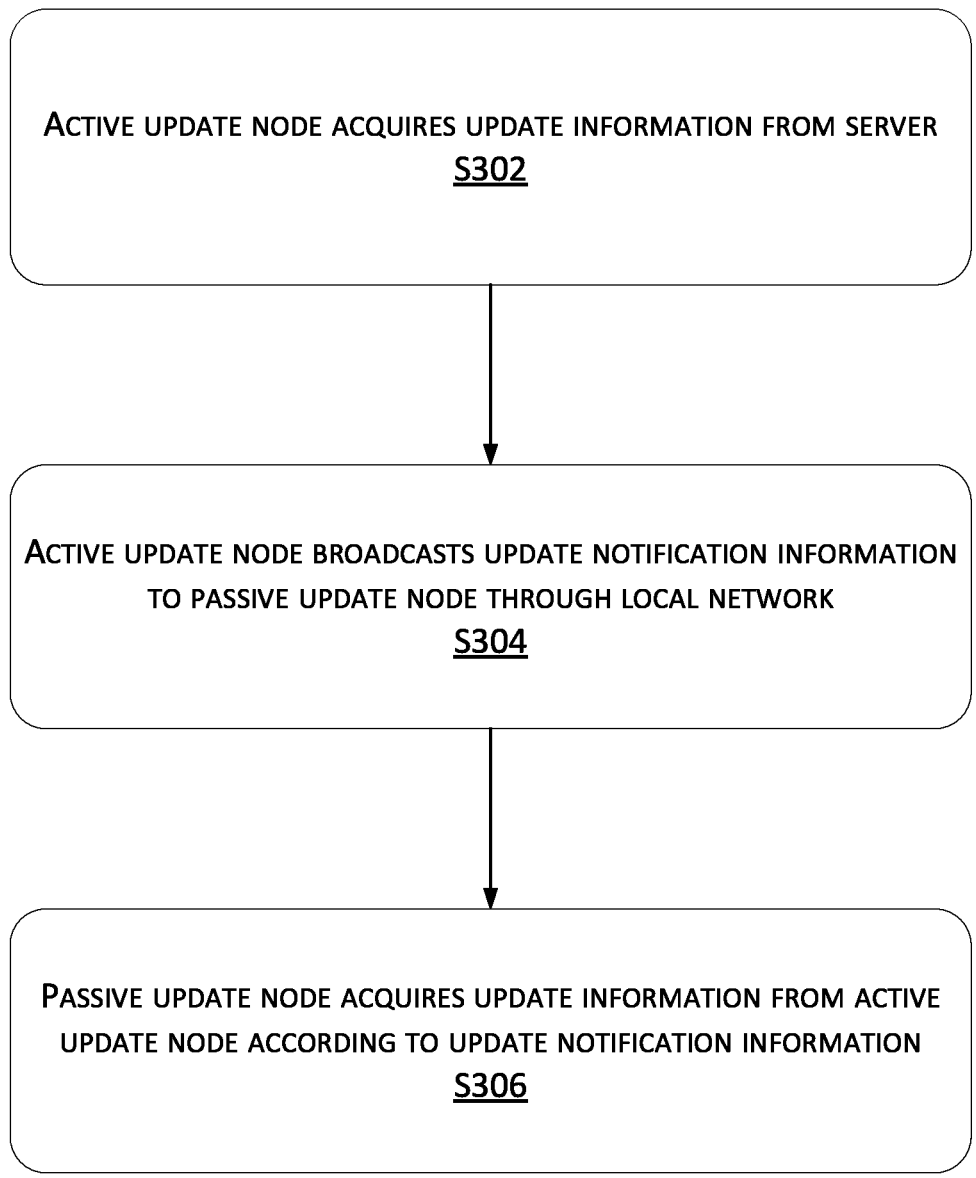
FIG. 3 is a schematic flowchart of still another example embodiment of an update method according to the present disclosure.

FIG. 3 is a schematic flowchart of still another example embodiment of an update method according to the present disclosure. The update method in the example embodiments of the present disclosure may be applied to the update system shown in FIG. 1, that is, the update method in the example embodiments of the present disclosure is executed by the update system shown in FIG. 1. In the update system, a plurality of end nodes is connected through a local network, and the plurality of end nodes includes at least one active update node and at least one passive update node. The update method in the example embodiments of the present disclosure is a specific implementation of the update method of Example embodiment 1. As shown in FIG. 3, the update method in the example embodiments of the present disclosure may include:

S302. The active update node acquires update information from a server.

For example, step S302 is the same as step S202 in Example embodiment 1, so the details will not be repeated here.

Step S204 in Example embodiment 1 may include the following steps S304 and S306.

S304. The active update node broadcasts update notification information to the passive update node through the local network.

For example, the active update node may broadcast the update information to the passive update node. That is, the active update node broadcasts update notification information to the passive update node through the local network. The update notification information is used for notifying the passive update node that there is new update information.

S306. The passive update node acquires the update information from the active update node according to the update notification information.

For example, after receiving the update notification information broadcast by the active update node, the passive update node acquires the update information from the active update node and performs an update according to the update information.

Further, as the update proceeds, when the number of the end nodes that have completed the update in the local network exceeds a set threshold (for example, ⅔), broadcasting is changed to unicasting, that is, the end nodes that have completed the update directly send, through the local network, the update information to the end nodes that have not completed the update, thus accelerating the update.

By using the update method according to the example embodiment of the present disclosure, only an active update node of a plurality of end nodes in the same local network acquires update information from a server, and a passive update node acquires the update information from the active update node, thereby reducing the number of end nodes acquiring the update information from the server, and reducing the burden of the cloud.

Example Embodiment 3

Figure 4:
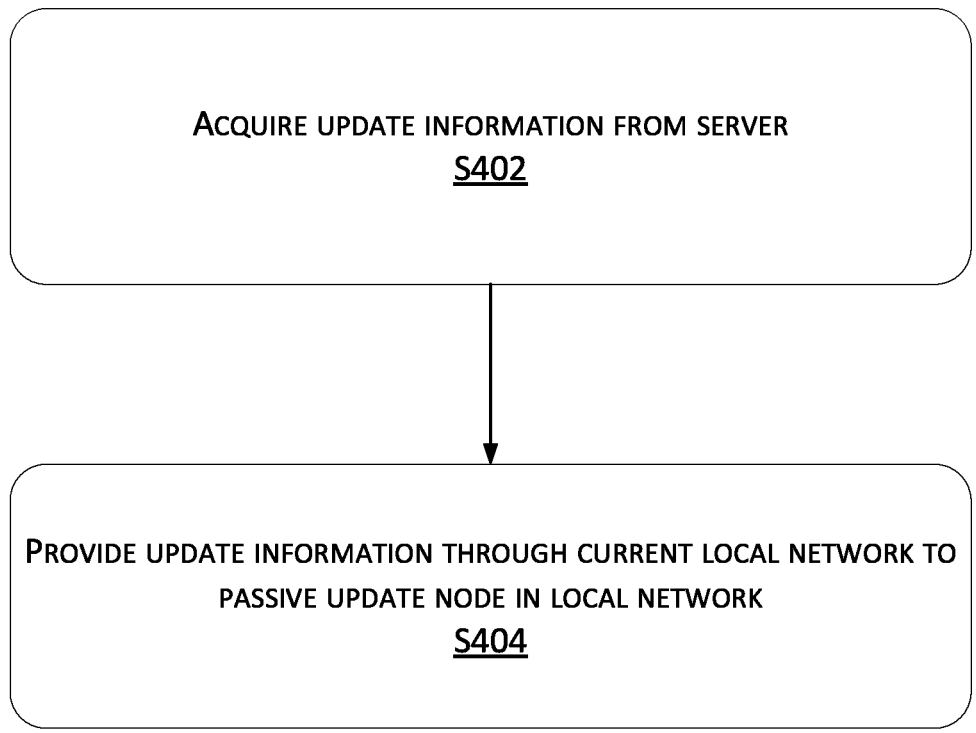
FIG. 4 is a schematic flowchart of still another example embodiment of an update method according to the present disclosure.

FIG. 4 is a schematic flowchart of still another example embodiment of an update method according to the present disclosure. The update method in the example embodiments of the present disclosure may be applied to the active update node in the update system shown in FIG. 1, that is, the update method in the example embodiments of the present disclosure is executed by the active update node in the update system shown in FIG. 1. As shown in FIG. 4, the update method in the example embodiments of the present disclosure may include:

S402. Acquire update information from a server.

S404. Provide the update information through a current local network to a passive update node in the local network.

Further, the update method in the example embodiments of the present disclosure may further include: establishing a cloud channel with the server. Step S402 may, for example, include: acquiring the update information from the server through the cloud channel.

Further, the update method in the example embodiments of the present disclosure may further include: performing an update according to the update information.

Further, step S404 may, for example, include: broadcasting update notification information to the passive update node through the local network, so that the passive update node acquires the update information according to the update notification information.

For example, for the specific implementation process of the update method in the example embodiments of the present disclosure, reference may be made to the related descriptions of Example embodiments 1 and 2, so the details will not be repeated here.

By using the update method according to the example embodiment of the present disclosure, only an active update node of a plurality of end nodes in the same local network acquires update information from a server, and a passive update node acquires the update information from the active update node, thereby reducing the number of end nodes acquiring the update information from the server, and reducing the burden of the cloud.

Example Embodiment 4

Figure 5:
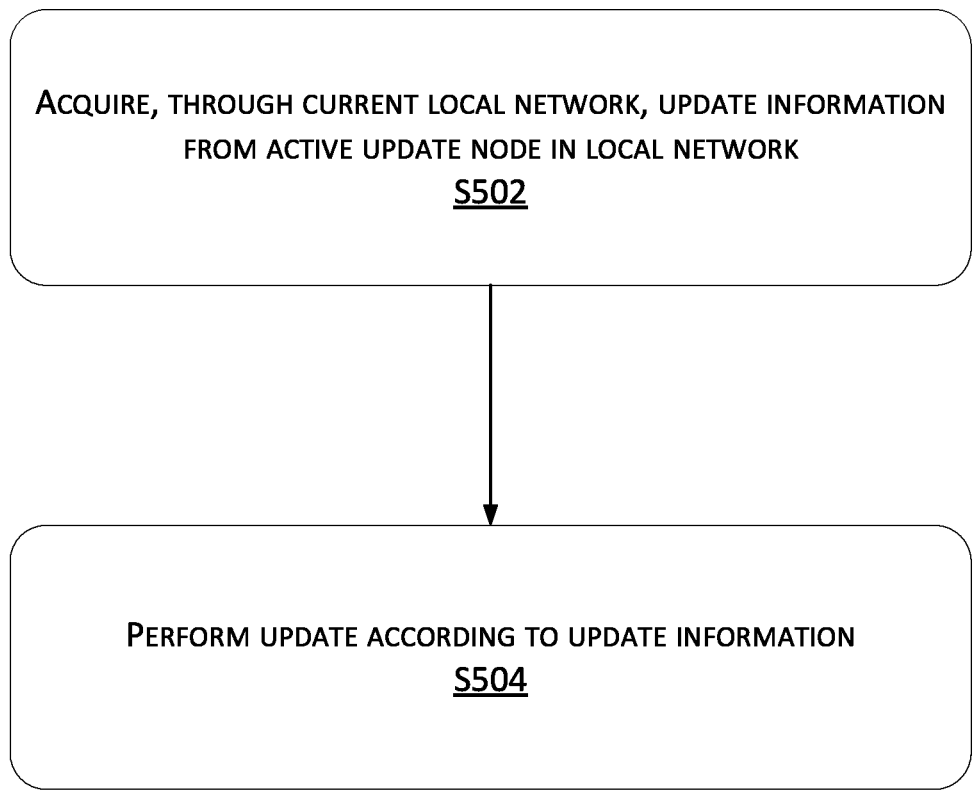
FIG. 5 is a schematic flowchart of still another example embodiment of an update method according to the present disclosure.

FIG. 5 is a schematic flowchart of still another example embodiment of an update method according to the present disclosure. The update method in the example embodiments of the present disclosure may be applied to the passive update node in the update system shown in FIG. 1, that is, the update method in the example embodiments of the present disclosure is executed by the passive update node in the update system shown in FIG. 1. As shown in FIG. 5, the update method in the example embodiments of the present disclosure may, for example, include:

S502. Acquire, through a current local network, update information from an active update node in the local network.

Further, the update method in the example embodiments of the present disclosure may further include:

S504. Perform an update according to the update information.

Further, step S502 may, for example, include: receiving update notification information broadcast by the active update node through the local network; and acquiring the update information from the active update node according to the update notification information.

For example, for the specific implementation process of the update method in the example embodiments of the present disclosure, reference may be made to the related descriptions of Example embodiments 1 and 2, so the details will not be repeated here.

By using the update method according to the example embodiment of the present disclosure, only an active update node of a plurality of end nodes in the same local network acquires update information from a server, and a passive update node acquires the update information from the active update node, thereby reducing the number of end nodes acquiring the update information from the server, and reducing the burden of the cloud.

Example Embodiment 5

An update system in the example embodiments of the present disclosure is as shown in FIG. 1, may execute the update methods of Example embodiments 1 and 2. As shown in FIG. 1, the update system in the example embodiments of the present disclosure may, for example, include: a local network, a plurality of end nodes and a server, wherein the plurality of end nodes is connected through the local network, the plurality of end nodes includes at least one active update node and at least one passive update node, and the active update node is connected to the server.

The active update node acquires update information from the server.

The passive update node acquires the update information from the active update node through the local network.

Further, the update system in the example embodiments of the present disclosure may further include: a cloud channel, the cloud channel being established between the active update node and the server. The acquiring, by the active update node, update information from the server includes: acquiring, by the active update node, the update information from the server through the cloud channel.

Further, the active update node performs an update according to the update information; and the passive update node performs an update according to the update information.

Further, each of the plurality of end nodes determines, according to a resource thereof and/or a location thereof in the local network, whether to become the active update node.

Further, the plurality of end nodes establishes the local network through a distributed self-configuring network.

Further, the acquiring, by the passive update node, the update information from the active update node through the local network includes: broadcasting, by the active update node, update notification information to the passive update node through the local network; and acquiring, by the passive update node, the update information from the active update node according to the update notification information.

Further, when the number of end nodes that have completed the update exceeds a set threshold, the end nodes that have completed the update directly send the update information to end nodes that have not completed the update through the local network.

Further, the update information includes firmware update information and configuration update information.

Further, the passive update node includes a mobile end node and a low-power end node.

For example, for specific processes used by the update system in the example embodiments of the present disclosure to implement its functions, reference may be made to the related descriptions of Example embodiments 1 and 2, so the details will not be repeated here.

By using the update system according to the example embodiment of the present disclosure, only an active update node of a plurality of end nodes in the same local network acquires update information from a server, and a passive update node acquires the update information from the active update node, thereby reducing the number of end nodes acquiring the update information from the server, and reducing the burden of the cloud.

Example Embodiment 6

Figure 6:
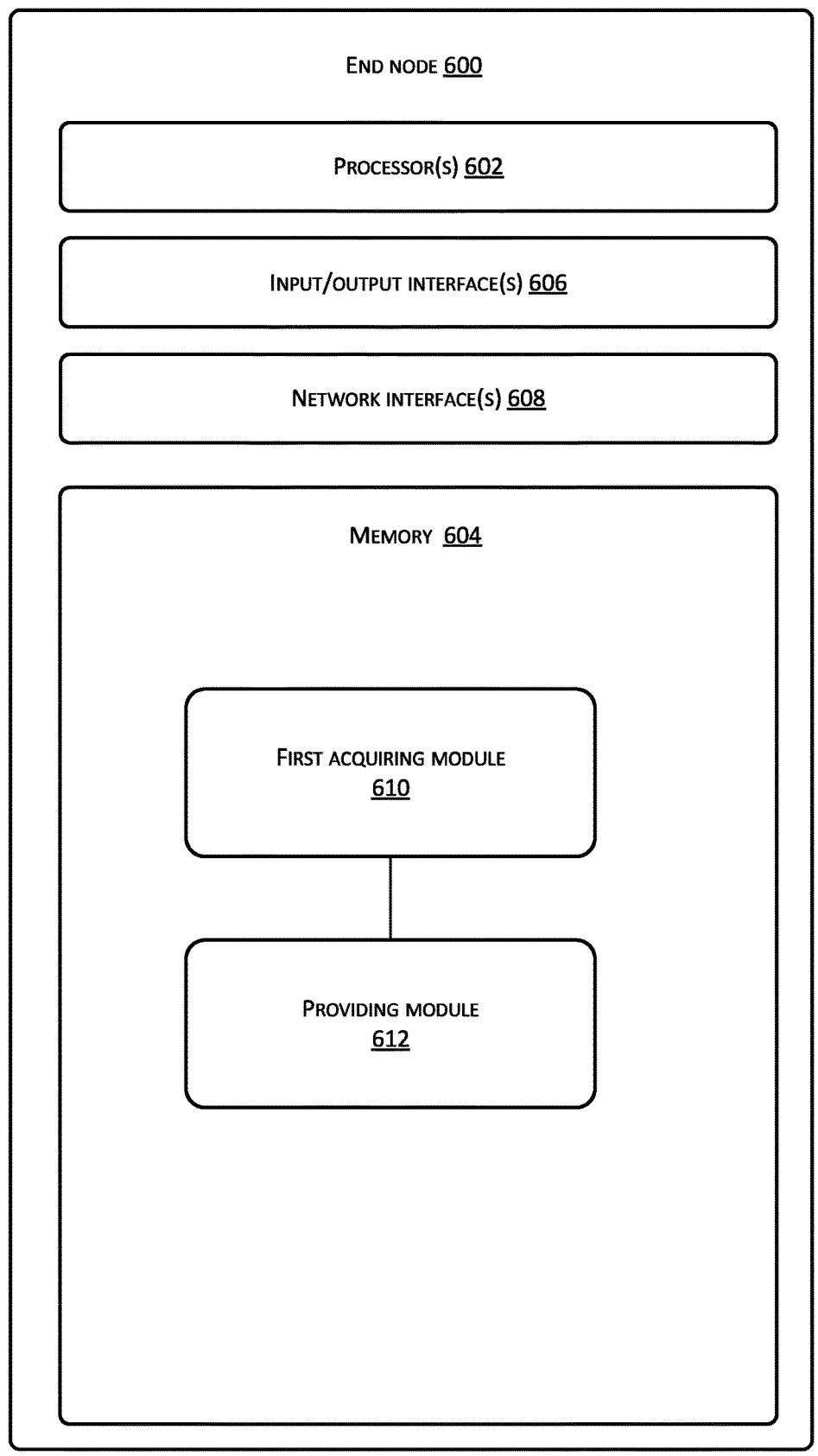
FIG. 6 is a schematic structural view of an example embodiment of an end node according to the present disclosure.

FIG. 6 is a schematic structural view of an example embodiment of an end node 600 according to the present disclosure. The end node in the example embodiments of the present disclosure is the active update node in the foregoing example embodiments and may execute the update method shown in Example embodiment 3. As shown in FIG. 6, the end node 600 in the example embodiment of the present disclosure includes one or more processor(s) 602 or data processing circuit unit(s) and memory 604. The end node 600 may further include one or more input/output interface(s) 606 and one or more network interface(s) 608. The memory 604 is an example of computer readable medium or media.

The computer readable medium includes non-volatile and volatile media as well as movable and non-movable media, and may implement information storage by means of any method or technology. The information may be a computer readable instruction, a data structure, and a module of a program or other data. An example of the storage medium of a computer includes, but is not limited to, a phase change memory (PRAM), a static random access memory (SRAM), a dynamic random access memory (DRAM), other types of RAMs, a ROM, an electrically erasable programmable read-only memory (EEPROM), a flash memory or other memory technologies, a compact disk read-only memory (CD-ROM), a digital versatile disc (DVD) or other optical storages, a cassette tape, a magnetic tape/magnetic disk storage or other magnetic storage devices, or any other non-transmission medium, and may be used to store information accessible to the computing device. According to the definition in this text, the computer readable medium does not include transitory media, such as a modulated data signal and a carrier.

The memory 604 may store therein a plurality of modules or units including a first acquiring module 610 and a providing module 612.

The first acquiring module 610 is configured to acquire update information from a server.

the providing module 612 is configured to provide the update information through a current local network to a passive update node in the local network.

Further, the end node in the example embodiments of the present disclosure may further include: an establishing module configured to establish a cloud channel with the server; and the first acquiring module 610 is, for example, configured to acquire the update information from the server through the cloud channel. Further, the end node in the example embodiments of the present disclosure may further include: a first update module configured to perform an update according to the update information.

Further, the providing module 612 may be, for example, configured to: broadcast update notification information to the passive update node through the local network, so that the passive update node acquires the update information according to the update notification information.

For example, for specific processes used by the modules in the end node in the example embodiments of the present disclosure to implement their functions, reference may be made to the related description of Example embodiment 3, so the details will not be repeated here.

As the active update node, the end node in the example embodiments of the present disclosure acquires the update information from the server, and the passive update node acquires the update information from the end node, so that the number of end nodes acquiring the update information from the server is reduced, thereby reducing the burden of the cloud.

Example Embodiment 7

Figure 7:
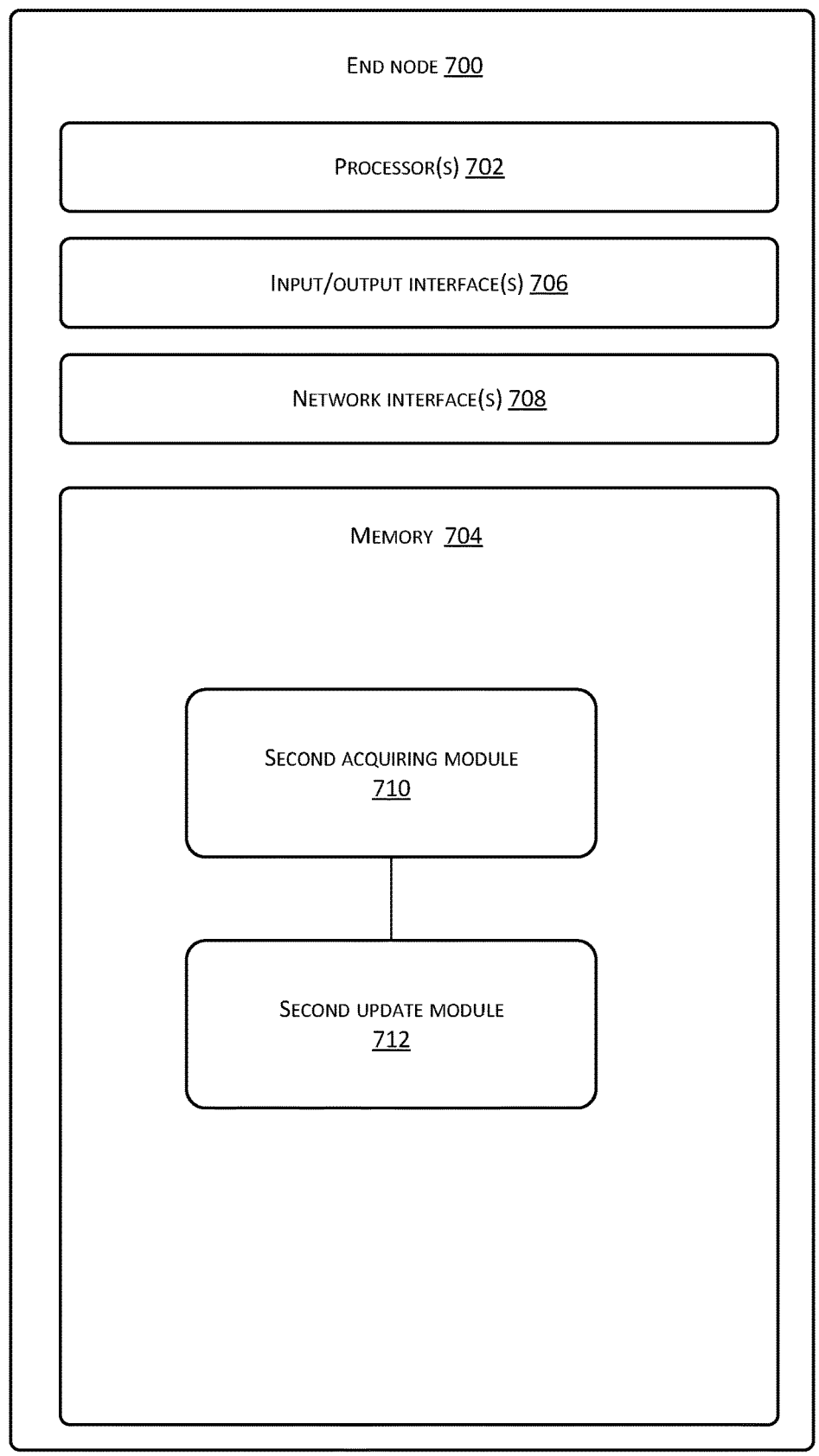
FIG. 7 is a schematic structural view of still another example embodiment of an end node according to the present disclosure.

FIG. 7 is a schematic structural view of still another example embodiment of an end node according to the present disclosure. The end node in the example embodiments of the present disclosure is the passive update node in the foregoing example embodiments and may execute the update method shown in Example embodiment 4. As shown in FIG. 7, the end node 700 in the example embodiment of the present disclosure includes one or more processor(s) 702 or data processing circuit unit(s) and memory 704. The end node 700 may further include one or more input/output interface(s) 706 and one or more network interface(s) 708. The memory 704 is an example of computer readable medium or media.

The memory 704 may store therein a plurality of modules or units including a second acquiring module 710.

The second acquiring module 710 is configured to acquire, through a current local network, update information from an active update node in the local network. Further, the end node 700 in the example embodiments of the present disclosure may further include a second update module 712 stored in the memory 704 configured to perform an update according to the update information.

Further, the second acquiring module 710 may be, for example, configured to: receive update notification information broadcast by the active update node through the local network; and acquire the update information from the active update node according to the update notification information.

For example, for specific processes used by the modules in the end node in the example embodiments of the present disclosure to implement their functions, reference may be made to the related description of Example embodiment 4, so the details will not be repeated here.

As the passive update node, the end node in the example embodiments of the present disclosure acquires the update information from the active end node, so that the number of end nodes acquiring the update information from the server is reduced, thereby reducing the burden of the cloud.

Example Embodiment 8

Figure 8:
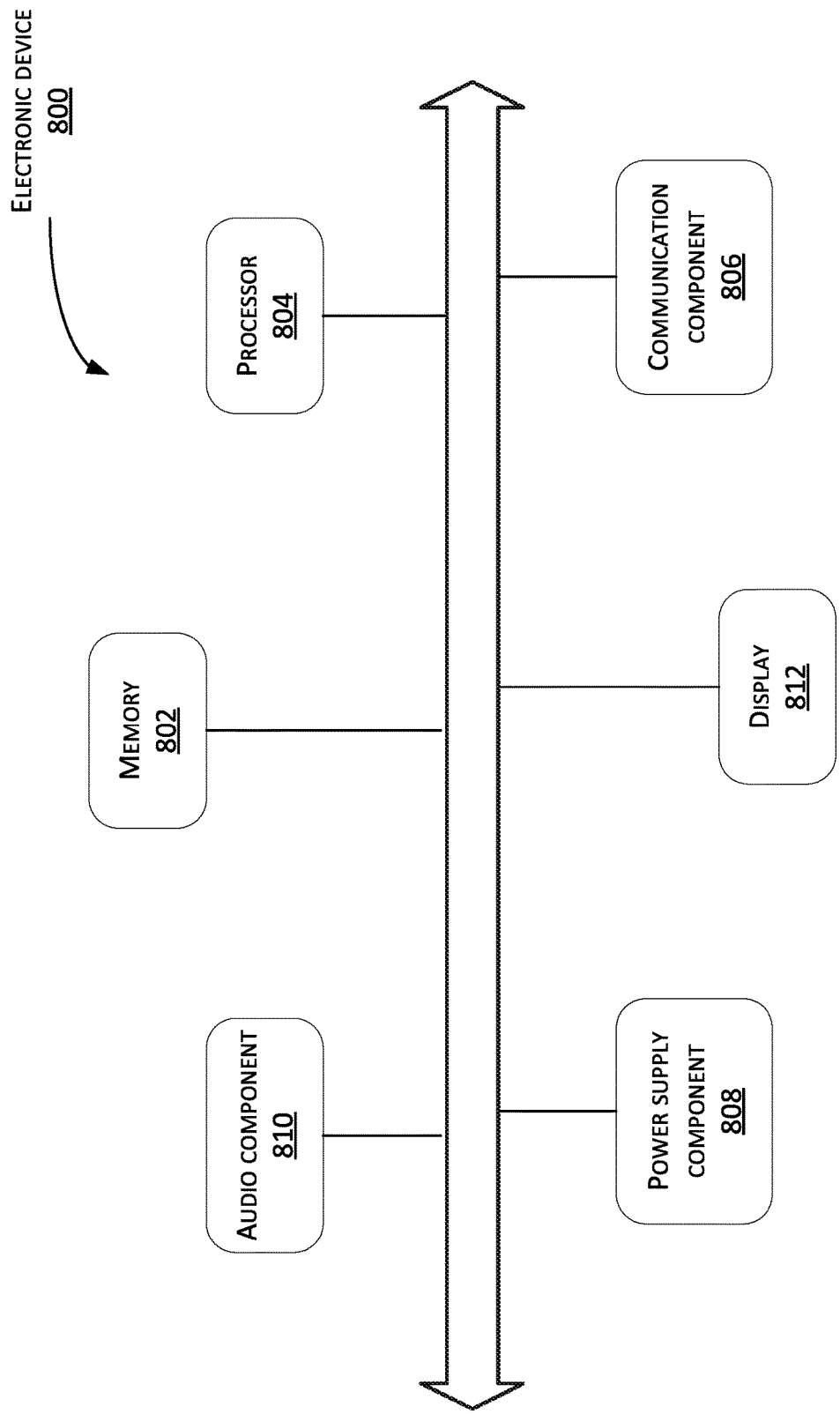
FIG. 8 is a schematic structural view of an example embodiment of an electronic device according to the present disclosure.

The internal functions and structures of the end nodes have been described above. FIG. 8 is a schematic structural view of an electronic device 800 according to an example embodiment of the present disclosure. As shown in FIG. 8, the end node in the foregoing example embodiments may be implemented as the electronic device 800, which may include: a memory 802 and a processor 804.

The memory 802 is configured to store a program or computer-readable instructions.

The memory 802 may be further configured to store other various data, in addition to the program, to support the operations of the electronic device. Examples of such data include instructions of any application or method configured to be executed on the electronic device, for example, online shopping platform data, online e-commerce platform data, phonebook data, messages, pictures, videos, and the like.

The memory 802 may be implemented using any type of volatile or non-volatile memory device, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, or a magnetic or optical disk. The memory 802 is an example of computer readable medium or media.

The processor 804 is coupled to the memory 802 and configured to execute the program in the memory 802.

In an example embodiment of the present disclosure, the processor 804 may be, for example, configured to:

acquire update information from a server; and provide the update information through a current local network to a passive update node in the local network.

In another example embodiment of the present disclosure, the processor 804 may be, for example, configured to:

acquire, through a current local network, update information from an active update node in the local network.

The above specific processing operations have been described in detail in the foregoing example embodiments, so the details will not be repeated herein.

Further, as shown in FIG. 8, the electronic device 800 may further include: a communication component 806, a power supply component 808, an audio component 810, a display 812 and the like. FIG. 8 schematically show some components and does not means that the electronic device includes only the components shown in FIG. 8.

The communication component 806 is configured to facilitate communications, wired or wirelessly, between the electronic device and other devices. The electronic device may access a wireless network based on a communication standard, such as WiFi, 2G, or 3G, or a combination thereof. In an example embodiment, the communication component 806 receives a broadcast signal or broadcast-related information from an external broadcast management system via a broadcast channel. In an example embodiment, the communication component 806 further includes a near field communication (NFC) module configured to facilitate short-range communications. For example, the NFC module may be implemented based on a radio frequency identification (RFID) technology, an infrared data association (IrDA) technology, an ultra-wideband (UWB) technology, a Bluetooth (BT) technology, or other technologies.

The power supply component 808 provides power to various components of the electronic device. The power supply component 808 may include a power supply management system, one or more power supplies, and/or other components relating to the generation, management, and distribution of power in the electronic device.

The audio component 810 is configured to output and/or input audio signals. For example, the audio component 810 includes a microphone (MIC) configured to receive an external audio signal when the electronic device is in an operation mode, such as a call mode, a recording mode, or a voice recognition mode. The received audio signal may be further stored in the memory 802 or transmitted via the communication component 806. In some example embodiments, the audio component 810 further includes a speaker to output audio signals.

The display 812 includes a screen. The screen may include a liquid crystal display (LCD) and a touch panel (TP). If the screen includes the touch panel, the screen may function as a touch screen configured to receive input signals from the user. The touch panel includes one or more touch sensors configured to sense touches, swipes, and gestures on the touch panel. The touch sensor(s) may not only sense space boundaries of a touch or swipe action, but also sense a period of time and a pressure associated with the touch or swipe action.

Those of ordinary skill may understand that all or part of the steps in the methods in the above example embodiments may be implemented through a program instructing related hardware. The program may be stored in a computer readable storage medium. When the program is executed, the steps in the methods in the above example embodiments are executed. The storage medium may include any medium capable of storing program code or computer-readable instructions, such as a Read-Only Memory (ROM), a Random-Access Memory (RAM), a magnetic disk, or an optical disc.

Finally, it should be noted that the above example embodiments are merely illustrative of the technical solutions of the present disclosure and are not intended to be limiting. Although the present disclosure has been described in detail with reference to the foregoing example embodiments, those of ordinary skill in the art will understand that the technical solutions described in the foregoing example embodiments may be modified, or some or all of the technical features may be equivalently replaced; and such modifications or replacements do not cause the essence of the technical solutions to depart from the scope of the technical solutions of the example embodiments of the present disclosure.

The present disclosure may further be understood with clauses as follows.

Clause 1. An update method, wherein a plurality of end nodes is connected through a local network, and the plurality of end nodes comprises at least one active update node and at least one passive update node, the update method comprising:

acquiring, by the active update node, update information from a server; and acquiring, by the passive update node, the update information from the active update node through a local network.

Clause 2. The update method according to clause 1, wherein the update method further comprises: establishing, by the active update node, a cloud channel with the server; and the acquiring, by the active update node, update information from a server comprises:

acquiring, by the active update node, the update information from the server through the cloud channel.

Clause 3. The update method according to clause 1, wherein the update method further comprises:

performing, by the active update node, an update according to the update information; and performing, by the passive update node, an update according to the update information.

Clause 4. The update method according to clause 1, wherein each of the plurality of end nodes determines, according to a resource thereof and/or a location thereof in the local network, whether to become the active update node.

Clause 5. The update method according to clause 1, wherein the update method further comprises:

establishing, by the plurality of end nodes, the local network through a distributed self-configuring network.

Clause 6. The update method according to clause 1, wherein the acquiring, by the passive update node, the update information from the active update node through a local network comprises:

broadcasting, by the active update node, update notification information to the passive update node through the local network; and acquiring, by the passive update node, the update information from the active update node according to the update notification information.

Clause 7. The update method according to clause 1, wherein the update method further comprises:

when the number of end nodes that have completed the update exceeds a set threshold, directly sending, by the end nodes that have completed the update, the update information to end nodes that have not completed the update through the local network.

Clause 8. The update method according to clause 1, wherein the update information comprises firmware update information and configuration update information.

Clause 9. The update method according to clause 1, wherein the passive update node comprises a mobile end node and a low-power end node.

Clause 10. An update method, comprising:
acquiring update information from a server; and
providing the update information through a current local network to a passive update node in the local network.

Clause 11. The update method according to clause 10, wherein the update method further comprises: establishing a cloud channel with the server; and
the acquiring update information from a server comprises:
acquiring the update information from the server through the cloud channel.

Clause 12. The update method according to clause 10, wherein the update method further comprises:
performing an update according to the update information.

Clause 13. The update method according to clause 10, wherein the providing the update information through a current local network to a passive update node in the local network comprises:
broadcasting update notification information to the passive update node through the local network, so that the passive update node acquires the update information according to the update notification information.

Clause 14. An update method, comprising:
acquiring, through a current local network, update information from an active update node in the local network.

Clause 15. The update method according to clause 14, wherein the update method further comprises:
performing an update according to the update information.

Clause 16. The update method according to clause 14, wherein the acquiring, through a current local network, update information from an active update node in the local network comprises:
receiving update notification information broadcast by the active update node through the local network; and
acquiring the update information from the active update node according to the update notification information.

Clause 17. An update system, comprising: a local network, a plurality of end nodes and a server,
wherein the plurality of end nodes is connected through the local network, the plurality of end nodes comprises at least one active update node and at least one passive update node, and the active update node is connected to the server;
the active update node acquires update information from the server; and
the passive update node acquires the update information from the active update node through the local network.

Clause 18. The update system according to clause 17, wherein the update system further comprises a cloud channel, the cloud channel being established between the active update node and the server; and
the acquiring, by the active update node, update information from the server comprises:
acquiring, by the active update node, the update information from the server through the cloud channel.

Clause 19. The update system according to clause 17, wherein the active update node performs an update according to the update information; and the passive update node performs an update according to the update information.

Clause 20. The update system according to clause 17, wherein each of the plurality of end nodes determines, according to a resource thereof and/or a location thereof in the local network, whether to become the active update node.

Clause 21. The update system according to clause 17, wherein the plurality of end nodes establishes the local network through a distributed self-configuring network.

Clause 22. The update system according to clause 17, wherein the acquiring, by the passive update node, the update information from the active update node through the local network comprises:
broadcasting, by the active update node, update notification information to the passive update node through the local network; and
acquiring, by the passive update node, the update information from the active update node according to the update notification information.

Clause 23. The update system according to clause 17, wherein when the number of end nodes that have completed the update exceeds a set threshold, the end nodes that have completed the update directly send the update information to end nodes that have not completed the update through the local network.

Clause 24. The update system according to clause 17, wherein the update information comprises firmware update information and configuration update information.

Clause 25. The update system according to clause 17, wherein the passive update node comprises a mobile end node and a low-power end node.

Clause 26. An end node, comprising:
a first acquiring module configured to acquire update information from a server; and
a providing module configured to provide the update information through a current local network to a passive update node in the local network.

Clause 27. The end node according to clause 26, wherein the end node further comprises:
an establishing module configured to establish a cloud channel with the server; and
the first acquiring module is specifically configured to acquire the update information from the server through the cloud channel.

Clause 28. The end node according to clause 26, wherein the end node further comprises:
a first update module configured to perform an update according to the update information.

Clause 29. The end node according to clause 26, wherein the providing module is specifically configured to:
broadcast update notification information to the passive update node through the local network, so that the passive update node acquires the update information according to the update notification information.

Clause 30. An end node, comprising:
a second acquiring module configured to acquire, through a current local network, update information from an active update node in the local network.

Clause 31. The end node according to clause 30, wherein the end node further comprises:
a second update module configured to perform an update according to the update information.

Clause 32. The end node according to clause 30, wherein the second acquiring module is specifically configured to:
receive update notification information broadcast by the active update node through the local network; and acquire the update information from the active update node according to the update notification information.

Clause 33. An electronic device, comprising:
a memory configured to store a program; and
a processor coupled to the memory and configured to execute the program to:
acquire update information from a server; and
provide the update information through a current local network to a passive update node in the local network.

Clause 34. An electronic device, comprising:
a memory configured to store a program; and
a processor coupled to the memory and configured to execute the program to:
acquire, through a current local network, update information from an active update node in the local network.

What is claimed is:

1. A method comprising:
acquiring, by an active update node, update information from a server, the active update node being an end node determined to be capable of connecting with the server for a certain period of time;
sending, by the active update node, the update information to a passive update node through a local network, the passive update node being an end node including an input/output interface and a network interface configured to access Internet, and determined to be not capable of connecting with the server for the certain period of time;
determining that a number of end nodes that have completed an update exceeds a preset threshold; and
changing a mode of sending the update information from broadcasting to unicasting, wherein changing the mode of sending the update information from broadcasting to unicasting causes the end nodes that have completed the update to send the update information to one or more end nodes that have not completed the update through the local network.

2. The method according to claim 1, further comprising establishing, by the active update node, a cloud channel with the server.

3. The method according to claim 1, wherein the acquiring, by the active update node, the update information from the server comprises:
acquiring, by the active update node, the update information from the server through the cloud channel.

4. The method according to claim 1, further comprising:
performing, by the active update node, the update according to the update information.

5. The method according to claim 1, wherein:
a plurality of end nodes is connected through the local network; and
the plurality of end nodes comprises at least one active update node and at least one passive update node.

6. The method according to claim 5, further comprising determining a respective end node of the plurality of end nodes as the active update node according to a resource of the respective end node.

7. The method according to claim 5, further comprising determining a respective end node of the plurality of end nodes as the active update node according to a location of the respective end node in the local network.

8. The method according to claim 5, further comprising establishing the local network by using the plurality of end nodes through a distributed self-configuring network.

9. The method according to claim 1, wherein the sending, by the active update node, the update information to the passive update node through the local network comprises:
broadcasting, by the active update node, update notification information to the passive update node through the local network.

10. The method according to claim 9, wherein the sending, by the active update node, the update information to the passive update node through the local network further comprises:
sending, by the active update node, the update information to the passive update node according to the update notification information received from the passive update node.

11. The method according to claim 1, wherein the update information comprises firmware update information.

12. The method according to claim 1, wherein the update information comprises configuration update information.

13. The method according to claim 1, wherein the passive update node comprises a mobile end node or a low-power end node.

14. A system comprising:
a local network;
a plurality of end nodes; and
a server, wherein:
the plurality of end nodes is connected through the local network;
the plurality of end nodes comprises at least one active update node and at least one passive update node, and the active update node is connected to the server;
an active update node of the at least one active update node acquires update information from the server, the active update node being an end node determined to be capable of connecting with the server for a certain period of time; and
a passive update node of the at least one passive update node acquires the update information from the active update node through the local network, the passive update node being an end node including an input/output interface and a network interface, and determined to be not capable of connecting with the server for the certain period of time, wherein a mode of sending the update information is changed from broadcasting to unicasting in response to determining that a number of end nodes that have completed an update exceeds a preset threshold, and changing the mode of sending the update information causes the end nodes that have completed the update to send the update information to one or more end nodes that have not completed the update through the local network.

15. The system according to claim 14, wherein:
the update system further comprises a cloud channel, the cloud channel being established between the active update node and the server;
the active update node acquires the update information from the server through the cloud channel.

16. The system according to claim 14, wherein:
the active update node performs the update according to the update information; and
the passive update node performs the update according to the update information.

17. The system according to claim 14, wherein each of the plurality of end nodes determines, according to a resource thereof or a location thereof in the local network, whether to become the active update node.

18. One or more memories storing computer readable instructions that, executable by one or more processors of a passive update node, cause the one or more processors to perform acts comprising:

acquiring, through a current local network, update information from an active update node in a local network, the active update node being an end node determined to be capable of connecting with the server for a certain period of time, and the passive update node further including an input/output interface and a network interface, and determined to be not capable of connecting with the server for the certain period of time, wherein the acquiring comprises:
  receiving update notification information broadcast by the active update node through the local network; and
  acquiring the update information from the active update node according to the update notification information; and
performing an update according to the update information;
determining that a number of end nodes that have completed an update exceeds a preset threshold;
changing a mode of sending the update information from broadcasting to unicasting, wherein changing the mode of sending the update information causes the end nodes that have completed the update to send the update information to one or more end nodes that have not completed the update through the local network.

* * * * *